(12) United States Patent
Rovinsky

(10) Patent No.: US 8,164,209 B2
(45) Date of Patent: Apr. 24, 2012

(54) METHOD AND APPARATUS FOR CREATING INTERNAL DIRECTIONAL UNDERWATER FALLS AND GENERATING ELECTRICAL ENERGY THEREFROM

(76) Inventor: William Rovinsky, Plainview, NY (US)

( * ) Notice: Subject to any disclaimer, the term of this patent is extended or adjusted under 35 U.S.C. 154(b) by 0 days.

(21) Appl. No.: 13/065,676

(22) Filed: Mar. 28, 2011

(65) Prior Publication Data

US 2011/0260459 A1 Oct. 27, 2011

Related U.S. Application Data

(63) Continuation-in-part of application No. 12/931,739, filed on Feb. 9, 2011, which is a continuation of application No. 12/802,260, filed on Jun. 3, 2010, now Pat. No. 7,915,750.

(60) Provisional application No. 61/342,893, filed on Apr. 21, 2010.

(51) Int. Cl.
*F03B 13/00* (2006.01)
(52) U.S. Cl. ............................................ 290/54; 290/52
(58) Field of Classification Search .............. 290/42–43, 290/53–54
See application file for complete search history.

(56) References Cited

U.S. PATENT DOCUMENTS

| 4,408,452 | A | * | 10/1983 | Tsunoda | 60/398 |
| 4,587,435 | A | * | 5/1986 | McCullough | 290/54 |
| 4,797,563 | A | * | 1/1989 | Richardson | 290/54 |
| 5,297,925 | A | * | 3/1994 | Lee et al. | 415/7 |
| 6,114,773 | A | * | 9/2000 | Kouris | 290/52 |
| 2009/0230687 | A1 | * | 9/2009 | Robichaud | 290/54 |

FOREIGN PATENT DOCUMENTS

| EP | 1531264 | 5/2005 |
| FR | 2813925 | 3/2002 |
| GB | 2456333 | 7/2009 |
| WO | WO 03/050411 | 6/2003 |
| WO | WO 2005/108240 | 11/2005 |

* cited by examiner

*Primary Examiner* — Michael Zarroli

(57) ABSTRACT

Creation of internal underwater falls and generation of electrical energy therefrom includes providing a hollow tank having a substantially vertical axis; locating a rotatable turbine in an interior of said tank and orienting said rotatable turbine so that its axis of rotation is an axis selected from consisting of a vertical axis of rotation and a horizontal axis of rotation; providing a directional flow of water into said tank forming a directional underwater fall in said tank, and directing the underwater fall onto blades of the turbine to rotate the turbine; connecting an electrical generator with a shaft of the turbine so that the rotation of the shaft of the turbine is transmitted to the electrical generator which thereby generates electricity; and evacuating water from an interior of the tank after water passes through the turbine, so as to leave under the turbine a space sufficient for a continuous flow of water into said tank, formation of the underwater fall into said tank, and flow of water out of said tank.

5 Claims, 5 Drawing Sheets

METHOD AND APPARATUS FOR CREATING INTERNAL DIRECTIONAL UNDERWATER FALLS AND GENERATING ELECTRICAL ENERGY THEREFROM

CROSS-REFERENCE TO A RELATED APPLICATION

This patent application is a continuation-in-part of U.S. patent application Ser. No. 12/931,739 filed on Feb. 9, 2011 which is continuation of U.S. patent application Ser. No. 12/802,260 filed on Jun. 3, 2010 which is now U.S. Pat. No. 7,915,750 and claims priority from provisional patent application Ser. No. 61/342,893 filed on Apr. 21, 2010 and it incorporates the subject matter of the above-identified patent applications and claims its priority from the above-identified applications.

BACKGROUND OF THE INVENTION

The present invention relates to a method and an apparatus for creating internal directional underwater falls and generating electrical energy therefrom.

Method and apparatus of this type are known in the art. U.S. patent application publication US 2008/0211231 discloses a device consisting of a container which is partially submerged in the sea in which force of the water flowing through the pipes causes turbines to rotate thus generating electricity which may be transmitted to land.

U.S. patent application publication 2009/0173404 discloses a system for providing a structure or structures for altering water surface temperature having a holding vessel with a wall extending above a water level and a submerged lower portion, with a conduit extending to a water depth.

International patent application publication WO 00/31412 discloses a unit for production of electric power using the energy of the sea water which changes kinetic and potential energy of waves into energy of position, based on differences in height.

International patent application publication WO 2005/106240 discloses a method for energetic technical and biological use of underground water in which water flows from a depth of water at hydrostatic pressure through pipes arranged in a wall built on solid ground, towards hydraulic turbines driving generators and/or other technical installations or devices to be driven. Water from the turbines then flows toward aquaculture structures installed deeper where the water is used to grow aquatic plants and rear aquatic animals or is used for technical purposes.

British patent GB 2,456,333 discloses a tidal pump system in which a water powered pump is actuated by variable water levels (e.g. tidal energy.) The pump may pump water between different depths within the water, e.g. to adjust nutrient levels or temperature, or it may pump fluids or fluent solids to or fro the water e.g. to provide materials, or to store gasses below water.

French patent FR 2,813,925 discloses electricity generation by tidal flow pressure using rising tide to transfer fresh water to a floating reservoir which then supplies a fixed reservoir via a turbine during ebbing tide.

U.S. patent application publication to Robichaud 2009/0230687 discloses a system of generating electrical energy, in which an underwater fall rotates a turbine to generate electricity, and a corkscrew driven by the turbine evacuates water. The rotation of the corkscrew is caused by the rotation of the turbine, not independently from the turbine, and therefore the corkscrew cannot generate more power than the power of water falling on the turbine and cannot evacuate the water under the turbine efficiently to create under the turbine an air-filled space which is necessary for the rotation of the turbine.

SUMMARY OF THE INVENTION

Accordingly, it is an object of the present invention to provide a method and an apparatus for creating internal directional underwater falls and generating electrical energy therefrom, which are further improvements of the existing methods and apparatuses.

In keeping with these objects and with others which will become apparent hereinafter, one feature of the present invention resides, briefly stated, in an apparatus for creating internal directional underwater falls and generating electrical energy therefrom, comprising a hollow tank having a substantially vertical axis; a rotatable turbine located in an interior of said tank and having an axis selected from the group consisting of a vertical axis and a horizontal axis; means providing a directional flow of water into said tank forming a directional underwater fall and directing the directional underwater fall onto blades of said turbine to rotate said turbine; an electrical generator connected with a shaft of said turbine so that the rotation of said shaft of said turbine is transmitted to said electrical generator which thereby generates electricity; and means for evacuating water from an interior of said tank after water passes through said turbine so as to leave under said turbine a space sufficient for a continuous flow of water into said tank, formation of the underwater fall in said tank, and flow of water out of said tank.

Another feature of the present invention resides in a method of creating directional underwater falls and generating electrical energy therefrom, comprising providing the steps of providing a hollow tank having a substantially vertical axis; locating a rotatable turbine in an interior of said tank and orienting said rotatable turbine so that its axis of rotation is an axis selected from consisting of a vertical axis of rotation and a horizontal axis of rotation; providing a directional flow of water into said tank forming a directional underwater fall in said tank, and directing the underwater fall onto blades of the turbine to rotate the turbine; connecting an electrical generator with a shaft of the turbine so that the rotation of the shaft of the turbine is transmitted to the electrical generator which thereby generates electricity; and evacuating water from an interior of the tank after water passes through the turbine, so as to leave under the turbine a space sufficient for a continuous flow of water into said tank, formation of the underwater fall into said tank, and flow of water out of said tank.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
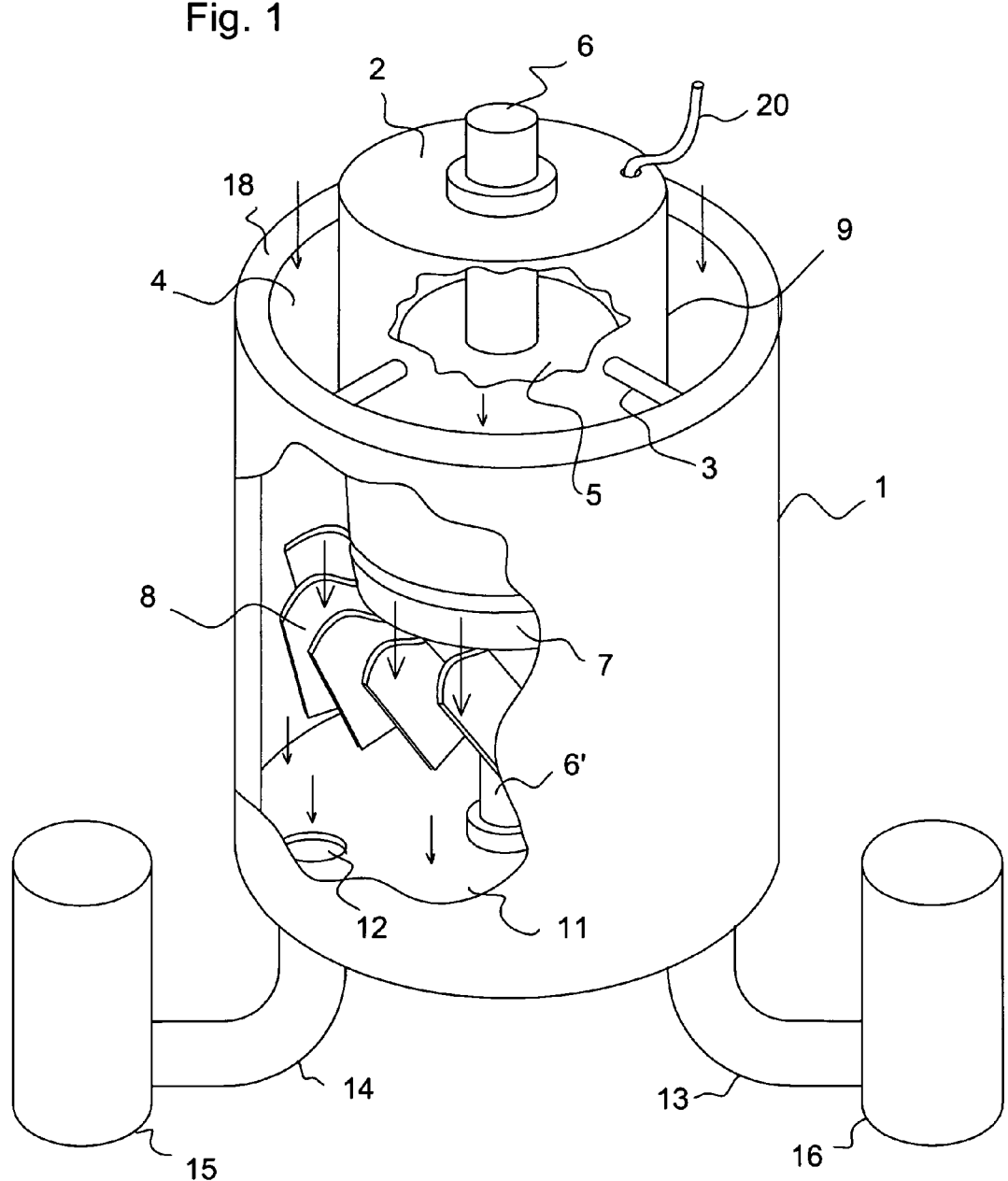
FIG. 1 shows an apparatus for creating internal directional underwater falls and generating electrical energy therefrom in accordance with a first embodiment of the present invention, with a tank, an insert arranged inside the tank, a turbine having a vertical axis of rotation and an electrical generator coaxial with the latter.
Figure 2:
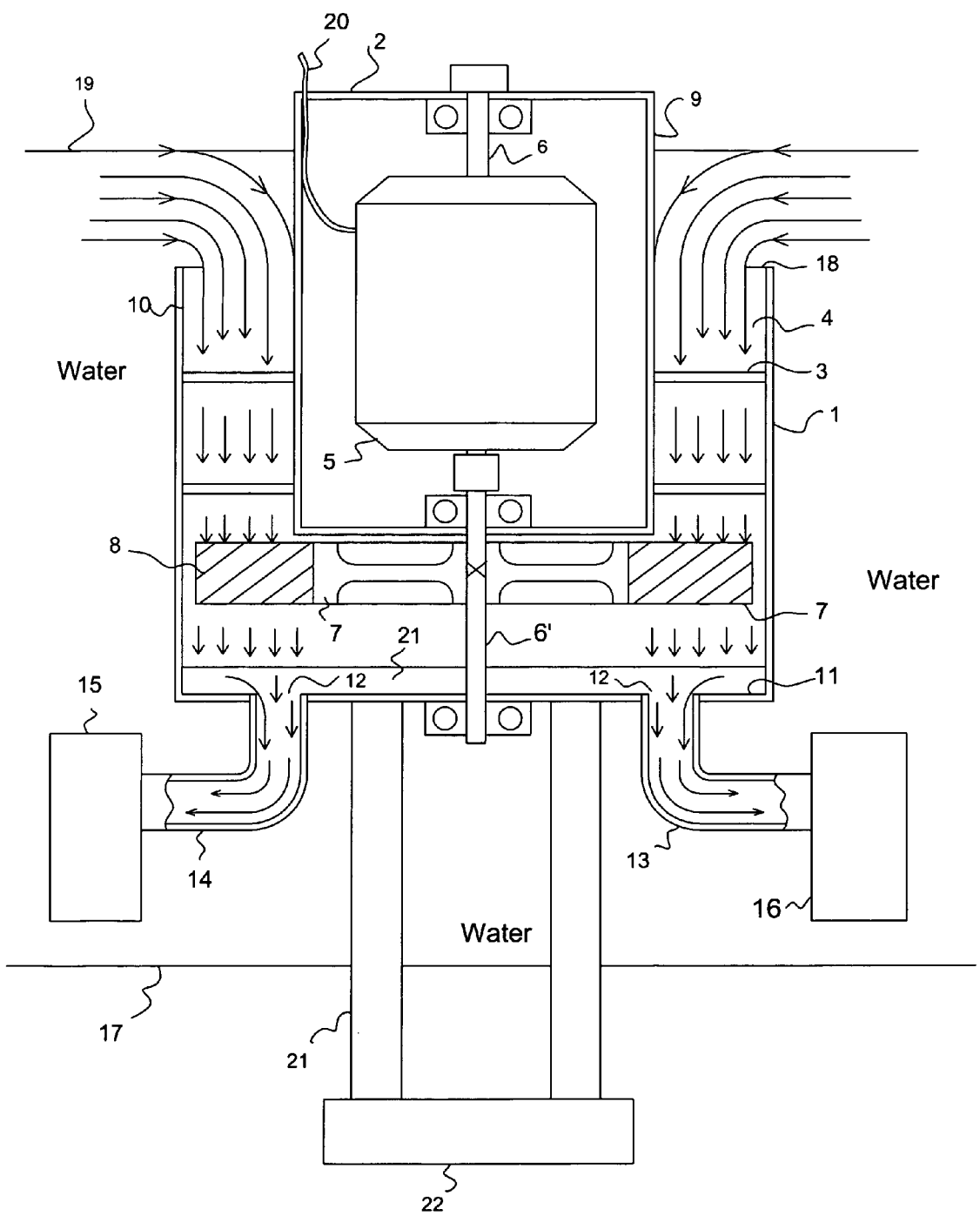
FIG. 2 is a view showing a vertical cross-section of the apparatus for creating internal directional underwater falls and generating electrical energy therefrom shown in FIG. 1.

FIGS. 1 and 2 are views showing an apparatus for creating internal directional underwater falls and generating electrical energy therefrom in accordance with a first embodiment of the present invention. The apparatus has a tank which is identified as a whole with reference numeral 1 and in the shown embodiment has a vertical axis. An insert 2 is accommodated inside the tank 1 and radially spaced from the latter. The insert 2 is connected with the tank 1 by a plurality of transverse connecting elements 3 with free spaces therebetween allowing a water flow through the spaces. The tank 1 and the insert 2 which is hollow, define there between a tubular annular space 4, which forms a means for providing a directional flow of water. An electrical generator 5 is arranged inside the insert 2 and has a shaft 6 which is rotatably supported in the bearings associated in an upper and lower walls of the insert 2 and with a shaft 6' of a turbine 7 having a plurality of blades 8. In the shown embodiment the shaft 6 of the electrical generator 5 and the shaft 6' of the turbine 7 rotate around a vertical axis. Preferably, a lateral wall 9 of the insert 2 and the lateral wall 10 of the tank 1 are concentric relative to the axis of the shafts 6 and 6' of the electrical generator 5 and the turbine 7.

A bottom 11 of the tank 1 is provided with outlets 12 which communicate with pipes 13 and 14 which are connected with evacuating means 15 and 16.

The apparatus is based on a floor of a water reservoir, and is supported by standoffs 21 and a base 22 located under a bottom of a body of water 17.

In operation the apparatus is introduced into water so that an upper open end 18 of the tank 1 is located below an upper surface 19 of the water reservoir. Water flows from the water reservoir into the annular opening between the tank 1 and the insert 2 creating an internal underwater fall. The water of the underwater fall falls on the blades 8 of the turbine 7 causing its rotation around the vertical axis, which is transmitted from the shaft 6' of the turbine 7 to the shaft 6 of the electrical generator 5. The electrical generator generates electricity which can be withdrawn for example through an electrical cable 20 for subsequent use. Water which has passed between the blades 8 of the turbine 7 flows into a space under the turbine and into the tubes 13 and 14 communicating with evacuating means 15 and 16 which evacuate water from the interior of the apparatus leaving a space under the turbine so that water can flow continuously into the tank, create an underwater fall, and flow out of the tank. Such evacuating means are disclosed in my patent application Ser. No. 12/931,739 and Ser. No. 12/802,260 and incorporated here by reference thereto.

Figure 3:
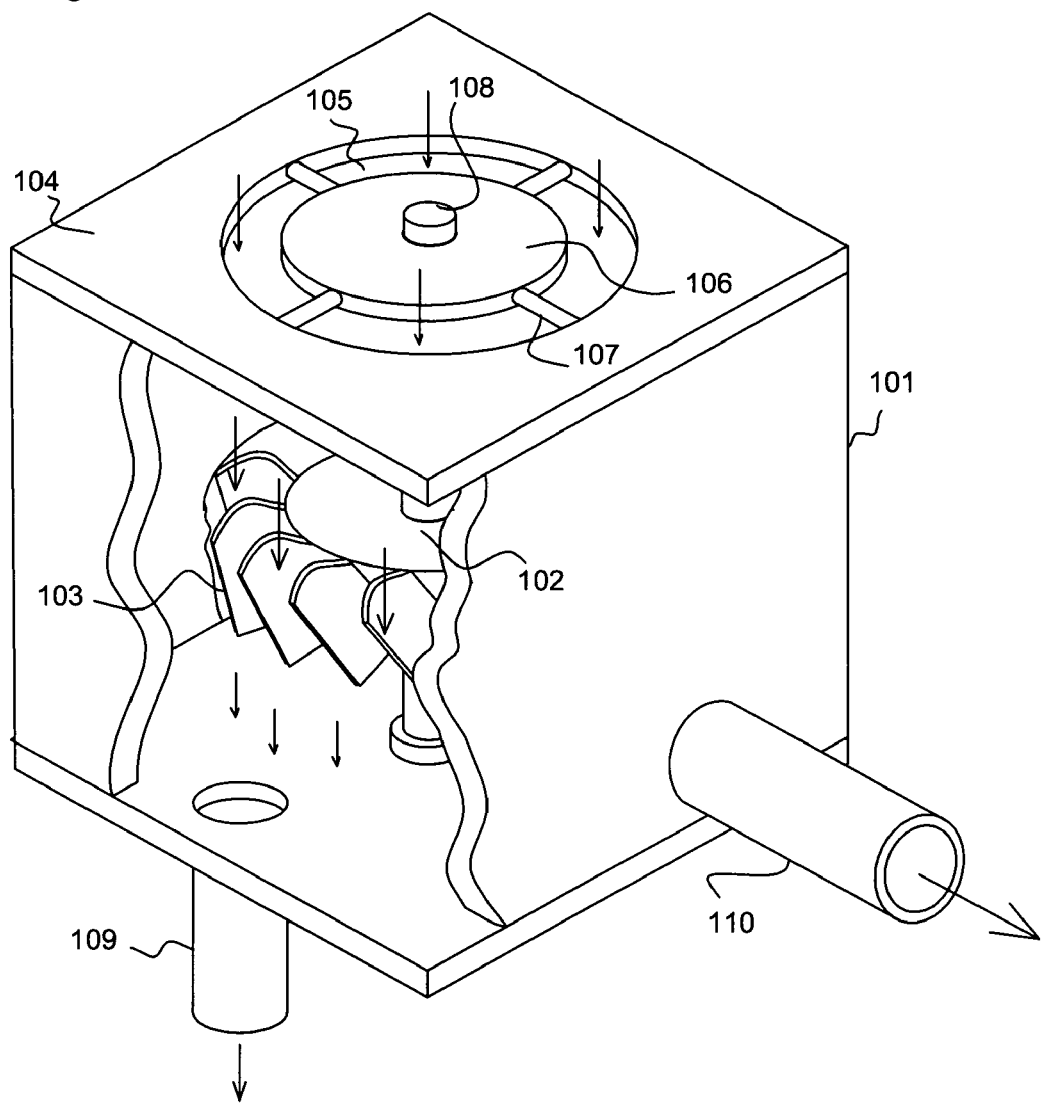
FIG. 3 is a view showing an apparatus for creating internal directional underwater falls and generating electrical energy therefrom in accordance with another embodiment of the present invention with directional means formed by an annular opening in a top of the tank.

FIG. 3 shows an apparatus for creating internal directional underwater falls and generating electrical energy therefrom which does not have an electrical generator and also does not have an insert inside the tank. In this embodiment a hollow tank 101 has also a vertical axis and accommodates a turbine 102 having a vertical axis of rotation and a plurality of blades 103. A top 104 of the tank 101 has an annular opening 105 between a central disk 106 and a remaining part of the top 104, which forms a means for providing a directional flow of water. The central disk 106 is connected with the remaining part of the top 104 of the tank 101 by a plurality of connecting elements 107 with open spaces between them. A shaft 108 of the turbine 102 extends upwardly beyond the central disk 106 and is connected with a not shown electrical generator which can be located at a different location.

In this embodiment due to the annular shape, dimension, and location of the annular opening 105 the water flows through the annular opening directionally into the interior of the tank 101 and creates a directional underwater fall which falls directly on the blades 103 of the turbine 102 causing the rotation of the turbine 102. Water is evacuated from the interior of the tank 101 through evacuating tubes 109 and 110 connected with not shown evacuating means mentioned above.

Figure 4:
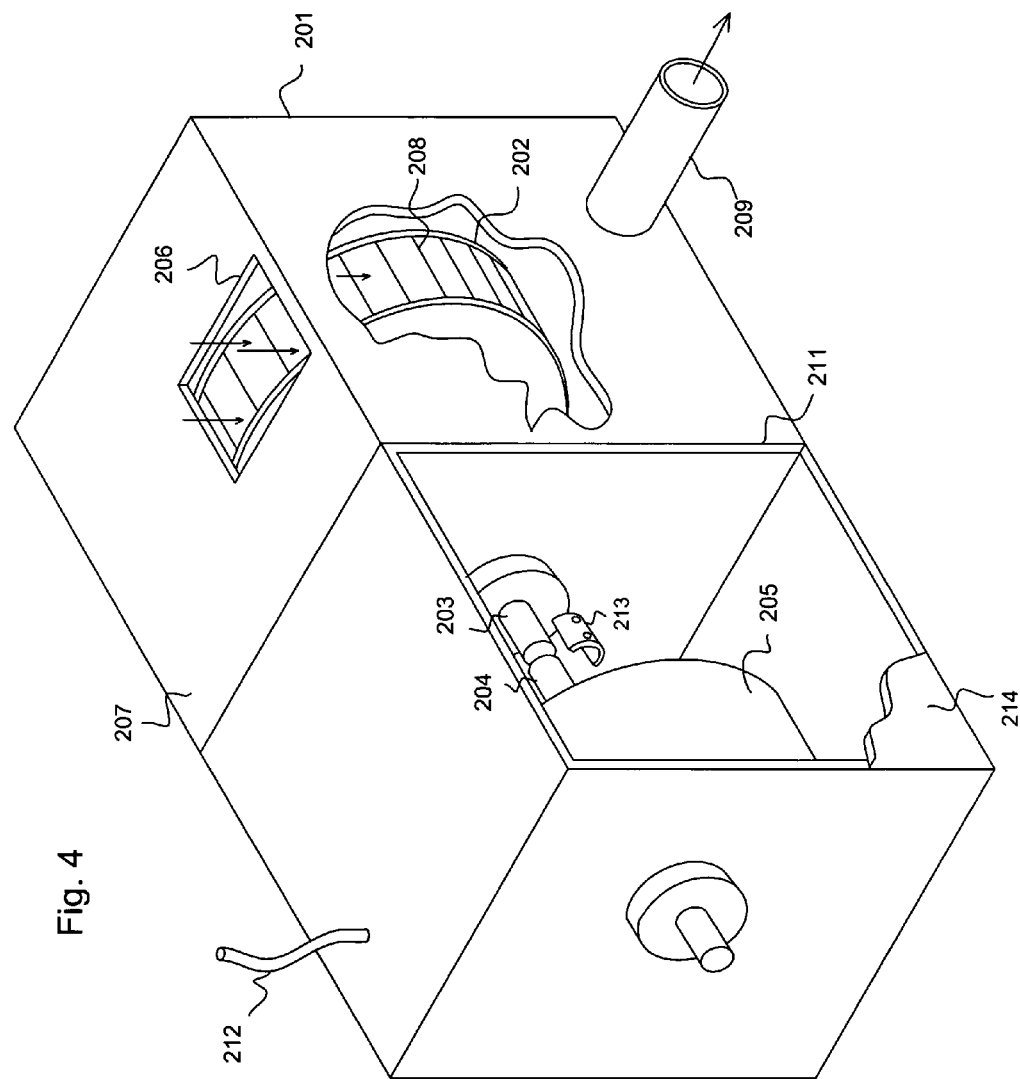
FIG. 4 is a view showing an apparatus for creating internal directional underwater falls and generating electrical energy therefrom in accordance with a further embodiment, with a turbine having a substantially horizontal axis of rotation and directional means formed by a substantially rectangular opening in a top of the tank, with the tank having a chamber in which an underwater fall is generated, and another dry chamber which accommodates an electrical generator.

FIG. 4 shows another embodiment of the apparatus for creating internal directional underwater falls and generating electrical energy therefrom has a hollow tank 201 accommodating turbine 202 having a plurality of blades 208 and rotating around a substantially horizontal axis of rotation. A shaft 203 of the turbine 202 is connected with a shaft 204 of an electrical generator 205 by coupling 213 for joint rotation therewith. Both shafts rotate around the above mentioned substantially horizontal axis.

While the turbine 202 is located in one compartment of the hollow tank 201, the electrical generator 205 is located in another compartment separated by a partition 211 from the first compartment. Front wall 214 is cut twice for better observation of the interior of both compartments.

The hollow tank 201 has an upper opening 206 provided in a top 207 of the first compartment of the tank 201, which forms a means for providing a directional flow of water. It is shaped substantially rectangular so that when the apparatus is submerged in water, water passes through the opening 206 and forms a directional underwater fall which falls directly on the blades 208 of the turbine 202 so as to rotate the turbine around the horizontal axis. The generator generates an electricity which is taken from the electrical generator 205 for use in a known manner, for example through a cable 212. The compartment in which the turbine 202 is located is partially filled with water, while the compartment in which the electrical generator is free of water and dry. The water is evacuated from the first mentioned compartment through the evacuating tube 209 connected with not shown evacuating means.

Figure 5:
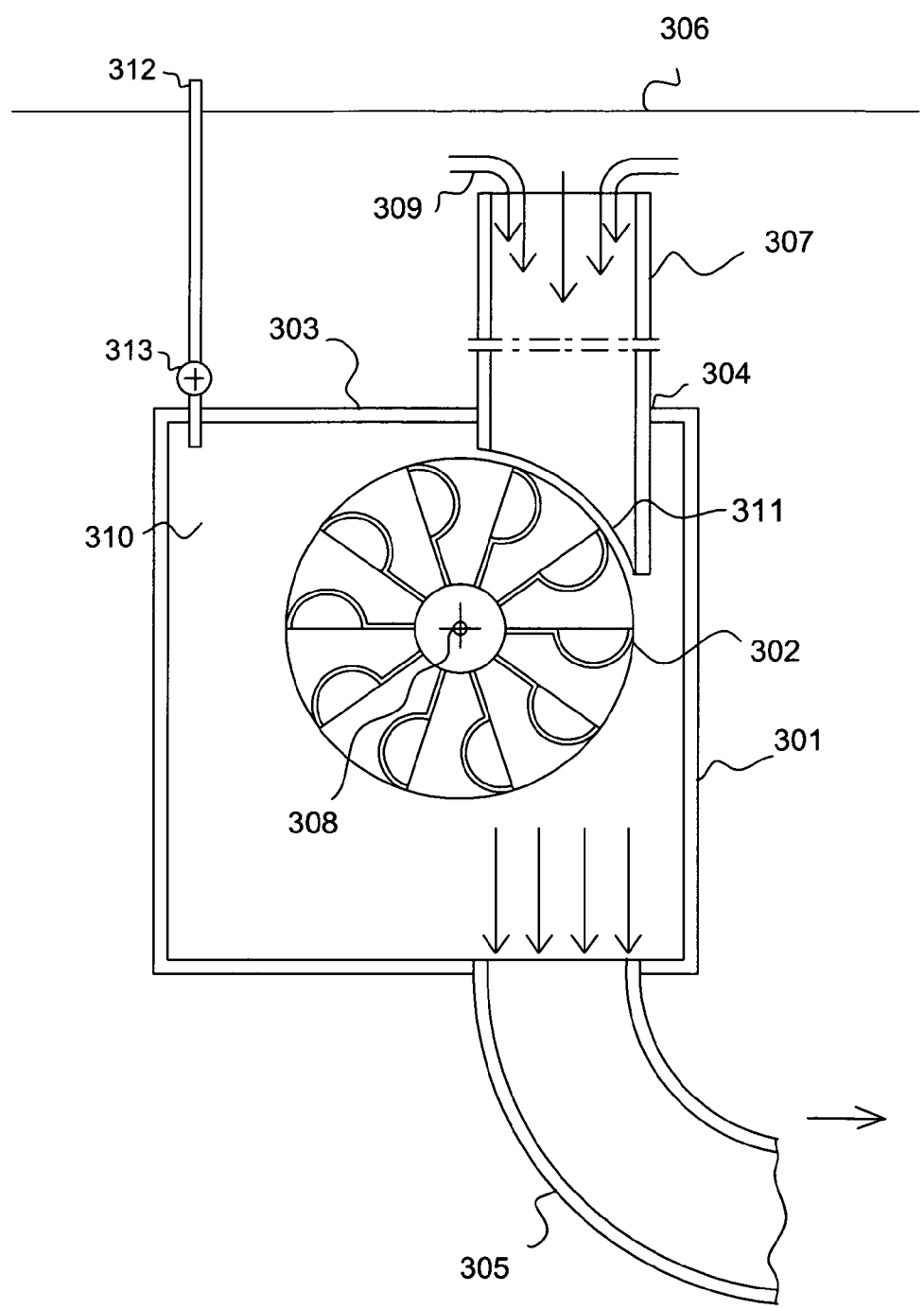
FIG. 5 is a view showing a cross-section of an apparatus for creating internal directional underwater falls and generating electrical energy therefrom in accordance with a further embodiment in which the turbine has a substantially horizontal axis with upwardly extended an insert for directing water into an interior of the tank onto blades of the turbine.

FIG. 5 shows a vertical cross-section of an apparatus for creating internal directional underwater falls and generating electrical energy therefrom in accordance with another embodiment of the present invention. It has a hollow tank 301 defining a single compartment in which a turbine 302 having a horizontal axis of rotation is accommodated. A top 303 of the tank 301 is provided with an opening 304, in which for more efficiency is placed an insert 307, which forms a means for providing a directional flow of water 309 A lower end 311 of the insert 307 is arcuate in correspondence with the counter of the turbine. It has a shape and dimensions selected so that when the apparatus is submerged in water with top level 306, water flows into the interior of the tank 301 through the insert 307 creating an underwater fall and exclusively on blades of the turbine 302 located only at the right side of the horizontal axis, as shown in this drawing. The created underwater fall operates only in the right part of the inner compartment of the tank 301, while the left part of the compartment 310 remains water free to allow rotation of the turbine. Interior of the tank is provided with a tubing 312 and a check valve 313 for communication with open air if necessary. Turbine shaft 308 is connected with a not shown shaft of an electrical generator which can be located at a different location. Water is evacuated from the hollow tank 301 through an evacuating pipe 305 connected with not shown evacuating means.

It will be understood that each of the elements described above, or two or more together, may also find a useful application in other types of methods and constructions differing from the type described above.

While the invention has been illustrated and described as embodied in method and an apparatus for creating internal directional underwater falls and generating electrical energy therefrom, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for creating internal directional underwater falls and generating electrical energy therefrom, comprising a hollow tank having a substantially vertical axis; a rotatable turbine located in an interior of said tank and having a horizontal axis; means providing a directional flow of water into said tank forming a directional underwater fall and directing the directional underwater fall onto blades of said turbine to rotate said turbine; an electrical generator connected with a shaft of said turbine so that a rotation of said shaft of said turbine is transmitted to said electrical generator which thereby generates electricity; and means for evacuating water from an interior of said tank after water passes through said turbine, wherein said means providing a directional flow of water include an opening provided in a top of said tank only at one side of said horizontal axis of said turbine so that said underwater fall acts exclusively on blades of said turbine and operates only in one part of the interior of said hollow tank at said one side, while another part of the interior of said hollow tank at another, opposite side of said horizontal axis of said turbine remains water free.

2. An apparatus as defined in claim 1, further comprising means for communicating said water free portion of the interior of said hollow tank with air above water surface to provide an atmospheric pressure inside of said hollow tank where turbine is operating.

3. An apparatus as defined in claim 2, wherein said means for communicating of an interior of said hollow tank with an atmospheric pressure has a check valve.

4. An apparatus as defined in claim 1, where said means for providing a directional flow of water include an insert arranged in said opening in the top of said tank.

5. An apparatus as defined in claim 4, where said insert has a lower end which is shaped in correspondence with a contour of said turbine.

\* \* \* \* \*